United States Patent [19]

Nye, Jr.

[11] Patent Number: 5,105,791
[45] Date of Patent: Apr. 21, 1992

[54] CURRENT TO PRESSURE/VACUUM TRANSDUCER

[76] Inventor: Dudley D. Nye, Jr., 4020 Galt Ocean Dr. #33308, Fort Lauderdale, Fla. 33308

[21] Appl. No.: 633,393

[22] Filed: Dec. 21, 1990

[51] Int. Cl.$^5$ ............................................. F02B 43/00
[52] U.S. Cl. .................................. 123/527; 251/129.22
[58] Field of Search .......................... 123/527; 137/82; 251/129.22

[56] References Cited

U.S. PATENT DOCUMENTS

| | | | |
|---|---|---|---|
| 4,084,539 | 4/1978 | Schmidt | 118/8 |
| 4,294,214 | 10/1981 | Treible | 137/495 |
| 4,325,399 | 4/1982 | Frick | 137/85 |
| 4,413,607 | 11/1983 | Batchelor et al. | 123/527 |
| 4,481,967 | 11/1984 | Frick | 137/85 |
| 4,595,029 | 6/1986 | Roth | 137/82 |
| 4,653,523 | 3/1987 | Brown | 137/85 |
| 4,665,938 | 5/1987 | Brown et al. | 137/85 |
| 4,729,398 | 3/1988 | Benson et al. | 137/82 |
| 4,836,011 | 6/1989 | Dombrowski et al. | 73/4 R |
| 4,874,005 | 10/1990 | Potter | 137/85 |
| 4,875,499 | 10/1989 | Fox | 137/82 |
| 4,901,756 | 2/1990 | Rovner | 137/487.5 |
| 4,905,720 | 3/1990 | Benson | 137/82 |

OTHER PUBLICATIONS

Moore Products Co., Spring House, PA, Model 771 I/P Transducers Installation/Service Manual Feb. 1986 SD771/2.

Hammel Dahl Electropneumatic Transducer Model T-28 Grinnell Valve Co., Warwick, RI, Dec. 1977 Instructions HDC14048.

Fisher Controls Kent ME, England Model 546 & 546S Electropneumatic Controls Bulletin 62.1:546 Feb. 1981.

*Primary Examiner*—Noah P. Kamen
*Attorney, Agent, or Firm*—Alvin S. Blum

[57] ABSTRACT

An electric current to gas pressure transducer provides a very low output pressure of just a few inches of water column and is capable of providing a negative or vacuum output as well as a low position pressure output. This transducer is used in an air/fuel ratio control system for natural gas fueled, naturally aspirated reciprocating engines to provide a fluid output to bias the setpoint or pressure loading input side of the engine's fuel gas regulator. A sensor in the engine's exhaust senses exhaust gas composition and provides an electric current to the transducer related to exhaust gas composition. The current powers an electromagnet in the transducer which regulates the flow of a fluid through an orifice to provide the fluid output at a pressure related to the exhaust gas composition for biasing the setpoint of the engine's gas fuel regulator in relation to exhaust gas composition for enhanced engine operation.

12 Claims, 3 Drawing Sheets

FIG. 3
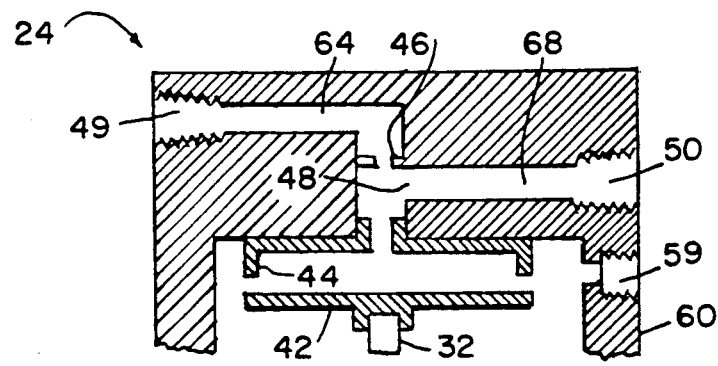
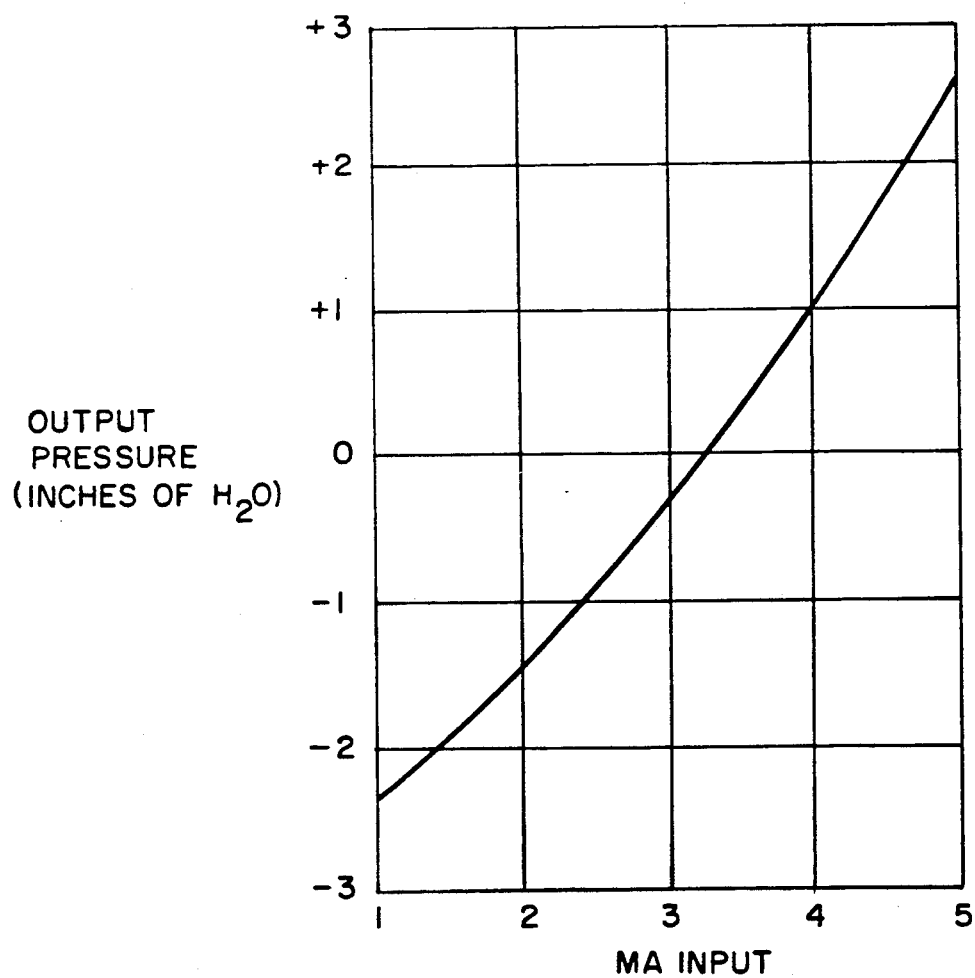
FIG. 4

CURRENT TO PRESSURE/VACUUM TRANSDUCER

BACKGROUND OF THE INVENTION

This invention relates to a current to low pressure transducer and more particularly to a design which can provide negative output pressure or a vacuum as well as a positive output pressure.

Current to air pressure transducers are used in many industrial instrumentation and control applications. Generally these transducers provide 3-15 psig output as the input current varies over its full range. The transducer design of this invention has the capability of much lower full scale pressure change. Full scale calibrations from 1 inch of water column to 10 inches of water column can be configured. In addition the output can be set to change smoothly from a vacuum to a pressure as the input current is varied.

An important application for this transducer is with respect to air/fuel ratio control of carbureted industrial gas fueled engines. These engines are used in gas pipeline pumping stations and in many other applications. In the engine application, a fuel gas regulator is used to supply gas to the carburetor at around 5 inches of water column. The carburetor is designed to keep the air fuel ratio approximately correct as the engine load varies, but this is not precise enough for extended life of a catalytic converter and also for meeting low pollution requirements. An electronic proportional plus integral air fuel ratio controller, utilizing a zirconium oxygen sensor, can be used to obtain this needed accuracy of control. Heretofore the 3 to 15 (or 6 to 30) psig output from a current to pressure transducer has provided excursive or modulated fluid pressure to an actuator affixed to the fuel gas regulator or to a bypass valve in order to trim the air/fuel ratio. The output pressure of the current to pressure transducer of this invention can supply modulated fluid directly to the setpoint side or loading side of the fuel gas regulator and thereby save the cost and trouble of installing the cylinder or actuator.

SUMMARY OF INVENTION

The current to pressure/vacuum transducer of this invention is designed to convert 1-5 mA. (or 4-20 mA.) from the air/fuel ratio controller to a plus or minus pressure of several inches of water column, producing a bias on the engine fuel gas regulator. The advantage of the vacuum and pressure output from the transducer of this invention is that the original settings of the engine's gas regulator pressure set spring, and the original carburetor adjustments, can be left undisturbed. If no air/fuel ratio trimming is required the controller will balance at a mid value where the current to pressure transducer output is at atmospheric pressure, resulting in zero bias applied. This arrangement greatly simplifies installation of the control system and also allows the engine to return to its original settings and adjustments if the trimming air/fuel ratio control system is removed. However, it may be desirable in some cases, when considering fail safe requirements, to offset the pressure set spring of the engine's gas pressure regulator and utilize only the vacuum or pressure mode of the transducer of this invention.

It is therefore one object of this invention to provide a transducer with a very low output pressure change in the range of 1 to 5 inches of water column in response to the input current of 1-5 mA. (or 4-20 mA.)

Another object of the invention is to provide a transducer with a negative or vacuum output in the range of 1 to 5 inches of water column in response to the input current.

Another object of the invention is to provide a transducer where the output varies smoothly from a vacuum to a pressure in response to the input current.

Another object of the invention is to provide a transducer with a plus and minus output pressure while using only a positive supply pressure.

Another object of the invention is to provide a transducer utilizing natural gas instead of air as a fluid medium.

Another object of the invention is to set forth a complete closed loop control system for air/fuel ratio utilizing the current to pressure transducer of this invention.

These and further objects and advantages of the invention will become more apparent upon reference to the following specifications, drawings and claims wherein:

BRIEF DESCRIPTION OF THE DRAWINGS

FIG. 3 shows in cross section the details of the fluid channels and piping used in the transducer of the invention.

FIG. 4 shows the typical relationship between d.c. current input and pressure output of the transducer of the invention.

DETAILED DESCRIPTION OF THE PREFERRED EMBODIMENTS

Figure 1:
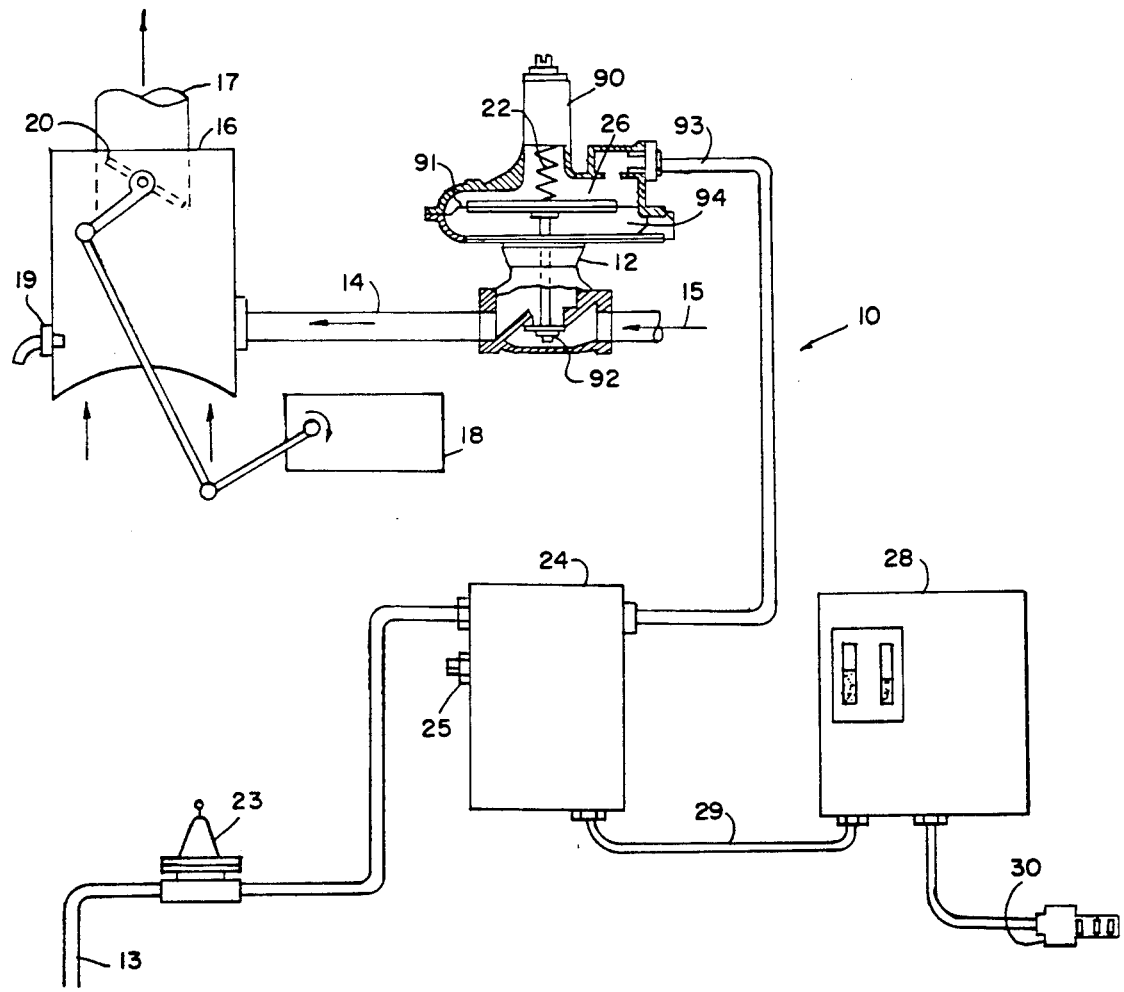
FIG. 1 is a simplified drawing of a fuel to air ratio control system utilizing the current to pressure transducer of the invention.

Referring to the drawings, FIG. 1 shows air/fuel ratio control system 10 for use with a naturally aspirated carbureted engine. In this system fuel gas regulator 12, with gas supply 15 as input supplies low pressure regulated gas 14 to carburetor 16. The engine speed is controlled by governor 18 in conjunction with butterfly valve 20 at outlet of carburetor 16. Engine intake manifold 17 conducts air and gas mixture to the engine. Gas pressure 14 is set by spring 22 in regulator 12. Current to pressure transducer 24 of the invention receives its supply pressure from instrument regulator 23 and then supplies loading pressure to regulator 12. The supply pressure conduit 13 on regulator 23 can be connected to either an air supply or connected to the gas supply 15. Transducer 24 has a small exhaust flow which is conducted away via fitting 25. When regulator 23 is supplied with natural gas 15 the exhaust or bleed fluid is conducted to a safe area by piping from fitting 25 or to fitting 19 on the air inlet to carburetor 16. Connecting the exhaust gas from 25 back into the engine air inlet 19 prevents deterioration of the vacuum output of transducer 24, due to pressure drop in the conduit connected to fitting 25, and in addition prevents the exhaust gas from being wasted. A gas pressure regulator 90 reduces and controls the pressure of fuel gas coming from a supply 15 by opening and closing valve 92 that is connected to diaphragm 91 until the forces on both sides of diaphragm 91 are equal. Gas pressure in chamber 94 is the only force on a first side of the diaphragm and will reflect the regulator outlet pressure in conduit 14 supplying fuel to the carburetor 16. The second side of diaphragm 91 has two forces acting on it: An adjustable spring bias 22 which is well known in the art, and a second force, the gas pressure in chamber 26, as supplied by conduit 93. This controlling gas pressure is regulated by a sensor 30 in the exhaust stream of the engine (not shown) to modulate the carburetor fuel supply for cleaner fuel burning to reduce stress on the environment and any catalytic converter. When it is negative, it opposes spring bias 22, when positive, it adds to spring bias force. Pressure increase in chamber 26 increases gas pressure 14 while a vacuum introduced into chamber 26 reduces gas pressure at conduit 14. Air/fuel ratio controller 28 supplies a d.c. current 29 to the input of transducer 24. The control loop is closed by supplying controller 28 with the electrical signal from oxygen sensor 30, located in the exhaust manifold of the engine.

Figure 2:
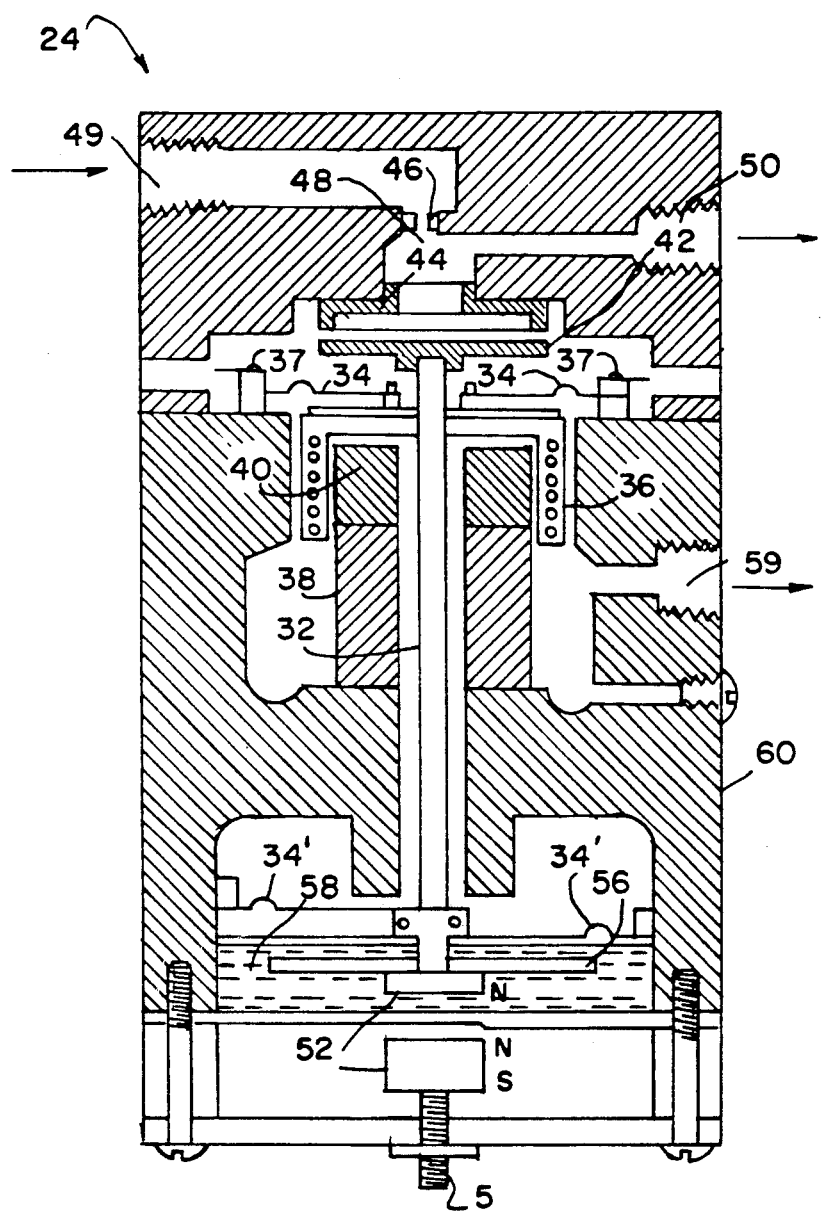
FIG. 2 is a cross sectional drawing of one form of the transducer of the invention.

FIG. 2 is a drawing of one form of transducer 24. The device is composed of balance shaft 32, spring flexures 34, force coil 36, coil terminals 37, magnet 38, soft iron pole piece 40, baffle 42, sensing cup 44, orifice 46, sensing chamber 48, supply port 49, output port 50, zeroing magnets 52, zero adjustment 54, damping vane 56, damping fluid 58, exhaust port 59 and unit enclosure 60. When an electric current passes through force coil electromagnet 36, the magnetic field generated therein opposes the field of magnet 38, forcing the balance shaft 32 upward.

With the device as depicted in FIG. 2, an input current into force coil electromagnet 36 causes balance shaft 32 to move up to bring baffle 42 close to the open end of sensing cup 44. If baffle 42 starts with a spacing of about 0.005 inches from sensing cup 44 a vacuum is produced at output port 50. This is due to the aspiration effect of fluid traveling through orifice 46 and chamber 48. As baffle 42 moves closer to sensing cup 44, fluid flow is reduced to the point where the vacuum at output port 50 is brought to zero or to atmospheric pressure. Further increase of current in force coil 36 causes the pressure at output port 50 to increase in the positive direction. The pressure in sensing cup 44 is self adjusting such that the fluid force on baffle 42 balances the force produced by force coil 36 and the other forces on balance shaft 32. Zeroing magnets 52 appose each other to support balance shaft 32 and to provide a calibration adjustment via calibration screw 54. Hollow damping vane 56 in damping fluid 58 prevents the closed loop mechanical spring and mass system from oscillating. Alternatively, the buoyancy of damping vane 56 and the spring bias of flexures 34' may be arranged to provide sufficient upward bias of balance shaft 32 to eliminate zeroing magnets 52.

FIG. 3 shows an expanded and more detailed view of the fluid flow arrangement in transducer 24. The supply pressure input port 49, flow channel 64, orifice 46, exhaust port 59, output port 50, output channel 68, baffle 42, movable member 32 and sensing cup 44 are shown in this figure. Fluid, air or gas, enters through input port 49 into flow channel 64 and subsequently into and out of orifice 46. It has been determined that a sharp edge orifice enhances the vacuum at output port 50. Equivalent orifice designs of greater length and larger diameter, providing the same fluid flow, do not result in as great a vacuum or aspiration effect as with the use of sharp edge orifice 46. The aspiration effect is enhanced by the higher velocity of fluid at the outlet of orifice 46. The use of a sharp edge orifice permits the required fluid flow through the system to be minimized. It is noted that output port 50 communicates with sensing chamber 48 through channel 68 to a point adjacent to the outlet of orifice 46. This also enhances the aspiration effect. Cylindrical sensing chamber 48 is reduced in diameter as it communicates with sensing cup 44. It was determined that this was necessary to prevent fluidic oscillation in the system. Exhaust port 59 is placed in enclosure 60 to collect fluid passing between sensing cup 44 and baffle 42 and to provide for a conduit to a safe area if natural gas is used as the fluid medium.

In conventional current to pressure transducers a nozzle of greatly reduced diameter, compared to diameter of the channel supplying fluid to it, is utilized. In the case of transducer 24 of this invention, a nozzle as such is not used. Fluid is supplied to sensing cup 44 from the much smaller diameter sensing chamber 48. This also enhances the aspiration effect and provides for the required very low inches of water column calibration. A calibration of plus and minus 2.5 inches of water column is obtained with the diameter of sensing cup 44 equal to 0.5 inches. This is with the supply pressure at input port 62 equal to 4.5 psig and a fluid flow of about 1.0 scfm.

The required fluid flow for a pressure only calibration, as set with zero adjustment 54, can be greatly reduced.

FIG. 4 is a graph showing the relationship of pressure at output port 50 and d.c. current input to force coil 36. It is noted that the transition from vacuum to pressure is smooth and continuous. Since the transducer is designed for use in a closed loop system such as that depicted in FIG. 1, exceptional stability and linearity is not important. However, the calibration is actually quite linear, stable and drift free and is more than adequate for the intended use.

The invention has been described with reference to the preferred embodiments. Obviously, modifications and alterations will occur to others upon reading and understanding the preceding detailed description. It is intended that this invention be construed as including all such alterations and modifications insofar as they come within the scope of the appended claims or the equivalents thereof.

Having thus described the preferred embodiments, the invention is now claimed to be:

1. A combination electric current to vacuum and electric current to pressure transducer comprising:

a transducer body having a supply pressure inlet port for a pressurized supply fluid, an electric current connector for a variable and controlling electric current and a regulated fluid pressure outlet port;

a movable member with a first magnetic means for providing a magnetic field and a baffle member attached thereto;

a stationary sensing cup means having a predetermined diameter connected to said transducer body with the open end thereof arranged to be variably occluded by said baffle member and with the bottom of said sensing cup means communicating with a first channel, said first channel having a diameter that is less than that of the open end of the sensing cup means and leading to an outlet of an orifice and with said orifice having an inlet arranged to communicate with said supply pressure inlet port;

a second channel communicating with said first channel in close proximity to the junction of said first channel and said orifice with said second channel communicating with said outlet port;

means for conducting fluid from said sensing cup to an exhaust port;

bias means connected to said transducer body for applying a bias force to said movable member for forcing said baffle member toward said sensing cup means; and a stationary second magnetic means connected to said transducer body and arranged to interact magnetically with said first magnetic means to thereby apply a moving force to said baffle member for variably occluding said sensing cup means, at least one of said magnetic elements being an electromagnet in which a magnetic field is generated by the electric current applied thereto by said variable electric current;

whereby said electric current controls the magnetic force regulating the force on said baffle member for partially occluding said sensing cup means and the force occluding said cup means regulates the flow of said pressurized supply fluid through said orifice and past the partially occluded cup means and the regulated fluid pressure at said outlet port will be substantially equal to the pressure at the outlet of said orifice and that pressure will be controlled by the magnitude of said electric current.

2. A transducer according to claim 1 in which said bias force is provided by spring means connecting said movable member to said transducer body.

3. A transducer according to claim 1 in which said bias force is provided by magnetic force generated by a plurality of permanent magnets, at least one of which is affixed to said movable member and at least one of which is affixed to said transducer body.

4. A transducer according to claim 1 in which said bias means is adjustable such that the pressure at said output port is negative as a function of the input current in said electromagnet.

5. A transducer according to claim 1 in which said bias means is adjustable such that the pressure at said output port is a positive pressure as a function of the input current in said force coil electromagnet.

6. A transducer according to claim 1 in which said bias means is adjustable such that the outlet pressure at said output port varies from negative to positive as a function of the input current in said electromagnet.

7. A transducer according to claim 1 further comprising:

a fuel gas pressure regulator having an inlet for a supply of fuel gas and an outlet for supplying fuel to an internal combustion engine at a controlled pressure regulated by the composition of exhaust gas emitted by said engine, in which said controlled pressure is controlled by a setpoint spring and by a loading or biasing pressure in combination, said biasing pressure being provided by conduit connection to said regulated fluid pressure outlet port;

and an exhaust gas sensing means for sensing the composition of exhaust gas from said engine said sensing means including means for generating said variable and controlling electric current related to the variable exhaust gas composition.

8. A transducer according to claim 1, in which said orifice is defined with a sharp edge.

9. A gas fuel to air ratio control system for a naturally aspirated, carbureted gas engine to control the composition of the engine exhaust gas comprising:

A) an exhaust gas sensing means for sensing at least one parameter of said exhaust gas composition, and arranged to sense said exhaust gas and to provide a controlling electric current output having a magnitude related to the magnitude of said parameter;

B) a current-to-pressure transducer means connected to said gas sensing means for providing a controlling output fluid pressure having a magnitude related to the magnitude of said controlling electric current, and C) a fuel gas pressure regulator having a valving element controlled by a diaphragm, an inlet for a supply of fuel gas, and an outlet for supplying said gas fuel to a carburetor of said engine at a controlled pressure, in which said controlled pressure is determined by two forces acting upon one side of said diaphragm, a setpoint spring bias means in combination with a loading or biasing pressure, said biasing pressure provided by operative connection to said controlling output fluid pressure of said transducer means.

10. The control system according to claim 9 in which said supply of fuel gas is at a pressure of less than seven inches of water and said controlling output fluid pressure is adjustable within a range of between about minus to plus five inches of water column.

11. The control system according to claim 10 in which said transducer means includes a first magnet element and a second magnet element, at least one of said magnet elements being an electromagnet powered by said controlling electric current; and an input fluid arranged to pass through a fixed restriction element and a variable resistance element in series, said variable resistance being controlled by magnetic interaction of said first and second magnet elements, whereby fluid at a point between said restriction element and said variable resistance element is operatively connected to provide said controlling output fluid pressure.

12. The control system according to claim 11 in which said parameter is oxygen concentration of said exhaust gas.

* * * * *